(12) United States Patent
Garrett

(10) Patent No.: US 9,203,976 B2
(45) Date of Patent: Dec. 1, 2015

(54) SYSTEM, METHOD, AND COMPUTER-READABLE MEDIUM FOR REBILLING A CARRIER BILL

(71) Applicant: Mobi Wireless Management, LLC, Indianapolis, IN (US)

(72) Inventor: Joshua Garrett, Zionsville, IN (US)

(73) Assignee: Mobi Wireless Management, LLC

( * ) Notice: Subject to any disclaimer, the term of this patent is extended or adjusted under 35 U.S.C. 154(b) by 110 days.

(21) Appl. No.: 13/958,738

(22) Filed: Aug. 5, 2013

(65) Prior Publication Data

US 2014/0066007 A1    Mar. 6, 2014

Related U.S. Application Data

(60) Provisional application No. 61/695,575, filed on Aug. 31, 2012.

(51) Int. Cl.
   *H04M 11/00*       (2006.01)
   *H04M 15/00*       (2006.01)

(52) U.S. Cl.
   CPC .............. *H04M 15/81* (2013.01); *H04M 15/43* (2013.01); *H04M 15/44* (2013.01); *H04M 15/70* (2013.01); *H04M 15/725* (2013.01); *H04M 15/80* (2013.01)

(58) Field of Classification Search
   CPC ..... H04W 4/24; H04W 4/26; H04M 2215/64; H04M 2215/724; H04M 2215/7245; H04M 2215/7281
   USPC .................................................. 455/406–408
   See application file for complete search history.

(56) References Cited

U.S. PATENT DOCUMENTS

| | | | |
|---|---|---|---|
| 8,588,736 B2 * | 11/2013 | Gorman et al. ................ | 455/408 |
| 8,903,356 B1 * | 12/2014 | Kates et al. .................... | 455/406 |
| 2014/0087688 A1 * | 3/2014 | Chiu et al. ..................... | 455/406 |

* cited by examiner

*Primary Examiner* — Temica M Beamer
(74) *Attorney, Agent, or Firm* — Ice Miller LLP

(57) ABSTRACT

System, method, and computer-readable medium for rebilling a carrier bill are disclosed. A computerized method for rebilling a carrier bill includes determining a ratio for distributing a total fee of one or more carrier bills for a plurality of mobile phones, determining an average cost per mobile phone based on the ratio and usage time, and determining a cost-per-time for each of the plurality of mobile phones based on the ratio and the usage time for the plurality of mobile phones. The method also includes determining a total cost for any of the plurality of mobile phones based on the average cost per mobile phone, the cost-per-time of the corresponding mobile phone, and a usage amount of the corresponding mobile phone.

20 Claims, 2 Drawing Sheets

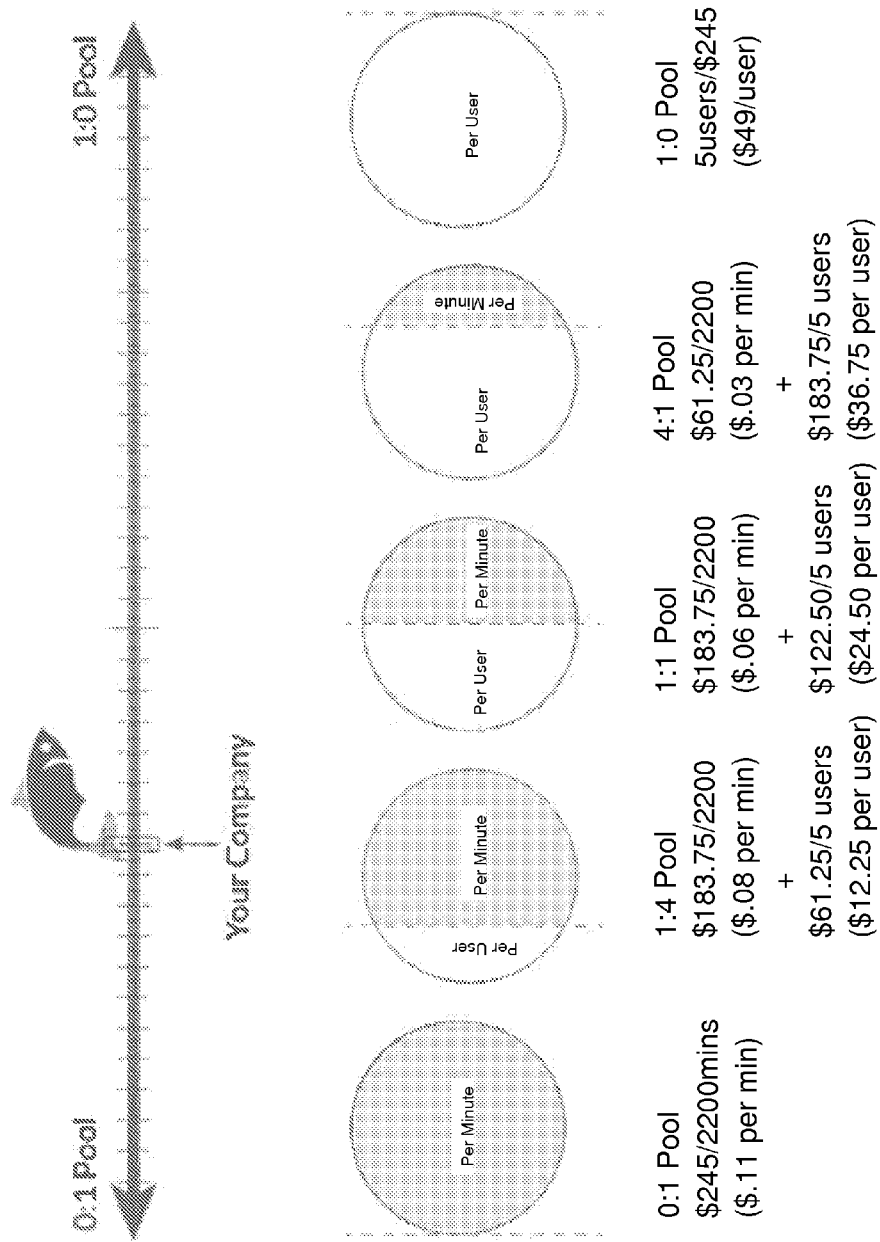

SYSTEM, METHOD, AND COMPUTER-READABLE MEDIUM FOR REBILLING A CARRIER BILL

CROSS REFERENCE TO RELATED APPLICATION

This application claims the benefit of and incorporates by reference herein the disclosure of U.S. Ser. No. 61/695,575, filed Aug. 31, 2012.

BACKGROUND

Many companies and associations pool wireless minutes by purchasing minutes in bulk and distributing them to their employees or members. Today, the billing in a group that pools minutes is determined using one of two calculations. The first option is a cost-per-device (or average cost) calculation. In the average cost calculation, each mobile phone is assigned a cost based on the average cost for the whole program. For instance, suppose Company A has 3,500 devices in its wireless program and after pooling Company A's minutes and plans, the total monthly bill for Company A is $175,000. In order to determine the average cost for Company A, the total cost ($175,000) is divided by the number of users (3500) to arrive at a cost-per-device of $50. As a result, each division of Company A would be responsible for $50 per device with a line of service. Unfortunately, the average cost option can result in disassociating usage patterns of end-users from the cost of the program. With no financial consequence, end-users may use more minutes than they ordinarily would use if they were being charged based on usage.

The second option is a cost-per-minute calculation. In a cost-per-minute calculation, users are billed based on the number of minutes used on their device. Generally, this is calculated by dividing the total program cost by the total number of minutes, then this number is multiplied by the usage of each device or the usage by each division of a company for the month to arrive at the total charge for a device or division, respectively. Unfortunately, the cost-per-minute option does not account for the basic costs of maintaining a line of service so there is little incentive to cull low-usage lines from the program.

Many wireless programs also include options for their users to add text-messaging or data plans to their phones. Such options are considered non-pooling features because these options can only be used on a particular phone and are not shared among all users. Today, these charges are typically lumped into the total bill so that every user must pay a share of every additional non-pooling feature.

Accordingly, there exists a need for a system, method, and computer-readable medium for rebilling that allows for customizing the pricing model by integrating both the average cost calculation and the cost-per-minute calculation and applying the costs of non-pooling features only to the corresponding device that utilizes such features.

SUMMARY

The present disclosure discloses a system, method, and computer readable medium for rebilling a carrier bill.

In at least one embodiment of the present disclosure, a computerized method for rebilling a carrier bill includes determining a ratio for distributing a total fee of one or more carrier bills for a plurality of mobile phones, determining an average cost per mobile phone based on the ratio and usage time for the plurality of mobile phones, and determining a cost-per-time for each of the plurality of mobile phones based on the ratio and the usage time for the plurality of mobile phones. The method also includes determining a total cost for any of the plurality of mobile phones based on the average cost per mobile phone, the cost-per-time of the corresponding mobile phone of the plurality of mobile phones, and a usage amount of the corresponding mobile phone of the plurality of mobile phones. In at least one embodiment of the present disclosure, a non-transitory computer-readable medium includes code portions that, when executed by a processor, administer the method steps described above for rebilling a carrier bill.

BRIEF DESCRIPTION OF THE DRAWINGS

The features and advantages of this disclosure, and the manner of attaining them, will be more apparent and better understood by reference to the following descriptions of the disclosed method and computer-readable program, taken in conjunction with the accompanying drawings, wherein:

FIG. 2 illustrates a graphical user interface displaying the ratio determination according to at least one embodiment of the present disclosure.

DETAILED DESCRIPTION

Figure 1:
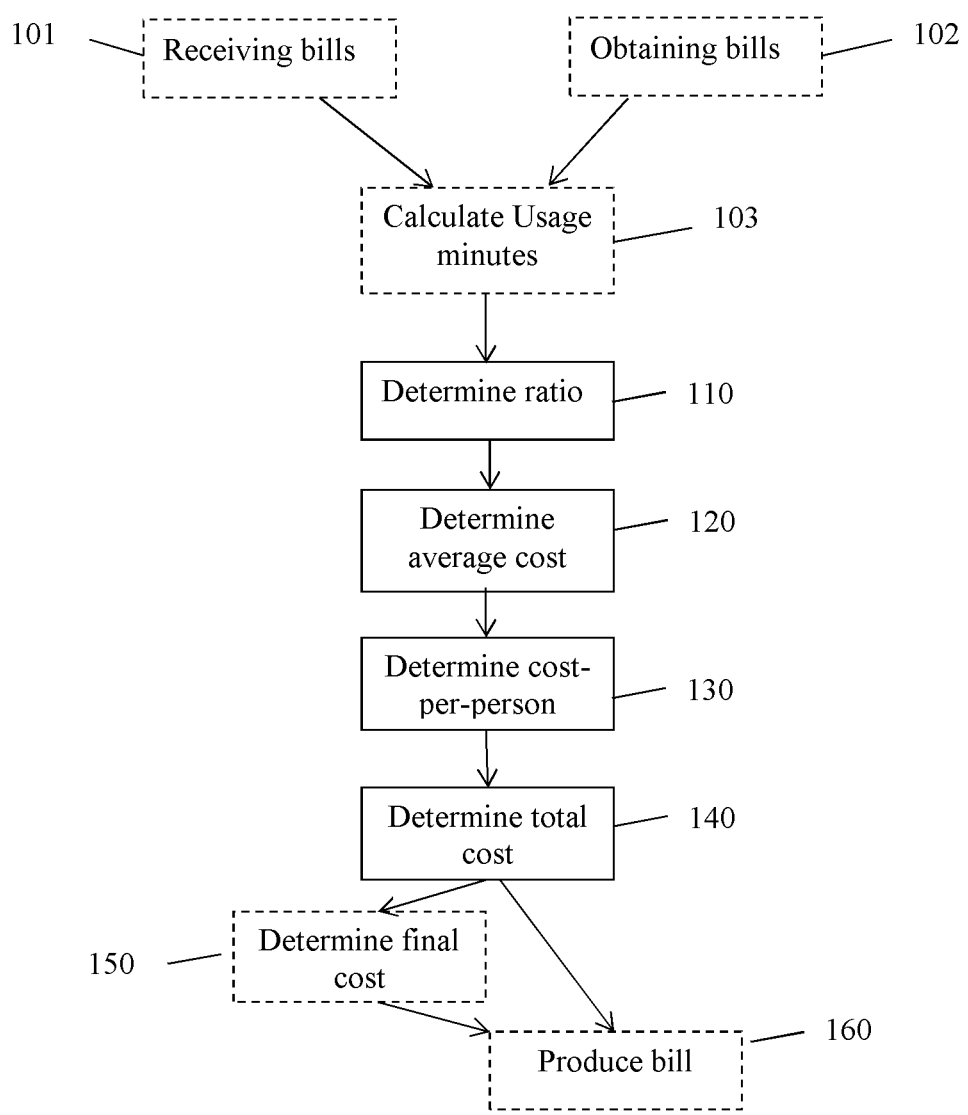
FIG. 1 shows a flow chart with the steps of a method for rebilling a carrier bill according to at least one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 shows a method 100 for rebilling a carrier bill according to at least one embodiment of the present disclosure. As shown in FIG. 1, the method 100 may optionally include the step 101 of receiving one or more carrier bills for the plurality of mobile phones. The one or more carrier bills may be received in a variety of ways, such as, for example, facsimile, e-mail, file transfer, post mail, manually entered, and the like. In an alternative to step 101, the method 100 may optionally include the step 102 of obtaining one or more carrier bills for the plurality of mobile phones. The one or more carrier bills may be obtained in a variety of ways, such as, for example, accessing a file or database. Of course, the one or more carrier bills may already be received or obtained. As shown in FIG. 1, after step 101 or step 102, the method 100 may optionally include the step 103 of calculating usage minutes for each of a plurality of mobile phones. The step 103 may include, for example, determining what minutes in one or more carrier bills are associated with anytime minutes and what charges are non-pooled features.

In FIG. 1, the method 100 includes the step 110 of determining a ratio for distributing the total monthly fee of the one or more carrier bills among an average cost pricing model and a cost-per-minute pricing model. At the inception of a program, the ratio may be chosen in a variety of ways, such as, for example, based upon the best judgment of an administrator, based upon the ratios used for similarly sized programs, based upon various factors regarding the users in the program, based upon the usage of minutes and/or the total number of minutes, based upon the number of minutes actually used and the number of minutes and the like. In at least one embodiment, the ratio may be chosen based upon data charges, data usage, taxes, and/or users themselves. This selection of a ratio may be performed manually or automatically. For example, an administrator may be able to interact with a graphical user interface (e.g., slide a bar on a display, turn a knob on a display, and the like) to adjust or alter the ratio. It should be noted that there may be more than one bar or knob on the display, which would allow an administrator to adjust the ratios applied to usage items, for example, that correspond to a particular knob. For instance, a user may adjust two knobs on the display that relate to minutes used and data usage to control the ratio for each.

In one example, a single ratio may be chosen by an administrator or automatically determined based upon one or more factors to be applied across the entire organization. In this example, the ratio for a single business unit of the organization may be altered (so that it is different from one or more other business units) based on all users within the business unit. For instance, this ratio for the particular business unit may be altered based on the job title or job classification of one or more users of the business unit within the organization. A ratio may also be altered based on the amount of domestic or international travel that said user performs. After an initial billing cycle, subsequent billing cycles, and/or at other intervals, the ratio may be adjusted automatically (or manually) based upon usage of minutes or other factors. For example, if the usage on a few mobile phones accounted for a large majority of the total minutes, the ratio may be set such that a larger percentage of the total monthly cost is charged to individual mobile phones via the cost-per-minute pricing model. That is, the few mobile phones that accounted for the large majority of minutes would be charged more than the other mobile phones because the basis for charging each individual mobile phone is largely based on how many minutes are used. In another example, if the usage on a few of the mobile phones in the program is low compared to others, the ratio may be set such that the larger percentage of the total monthly cost is charged to individual phones via the average cost pricing model. Such a ratio may force those low usage mobile phones to pay at least the cost of maintaining their phone service in the program. Therefore, the selection of a particular ratio can ensure that all charges are fairly allocated among mobile phones.

In FIG. 1, the method 100 includes the step 120 of determining an average cost per mobile phone based on usage minutes for each of a plurality of mobile phones. The average cost is calculated by multiplying the total monthly bill for the plurality of mobile phones by the ratio of step 110 and dividing by the number of the plurality of mobile phones. In FIG. 1, the method 100 also includes the step 130 of determining a cost-per-minute for each of the plurality of mobile phones based on the usage minutes. The cost-per-minute is calculated by multiplying the total monthly bill for the plurality of mobile phones by the result of one minus the ratio of step 110 and dividing this number by the total number of minutes. While the average cost is described as being a calculation based on the ratio of step 110 and cost-per-minute is based on one minus the ratio of step 110, average cost may alternatively be calculated based on one minus the ratio of step 110 and cost-per-minute may be based on the ratio of step 110. While the description, including FIG. 1, refers to rebilling as it relates to pooled telephone minutes, the system, method, and computer-readable medium for rebilling of the present disclosure can also be applied to pooled data plans in the same way it is applied to telephone minutes.

FIG. 2 shows an example of how the ratio from step 110 can shift the cost driver between average cost and cost-per-minute. In FIG. 2, the total monthly fee for this particular company is $245. As shown in FIG. 2, the "0:1 pool" (or ratio=0) is a pure cost-per-minute policy and results in a cost of $0.11/minute. The "1:0 pool" (or ratio=1) is a pure average cost policy and results in a cost of $49/user. The other ratios include both cost policies (average cost and cost-per-minute). For example, the "1:4 pool" (or ratio=0.25) splits the total monthly fee ($245) such that 25% is average cost ($12.25/user) and 75% is cost-per-minute ($0.08/minute).

The method 100 further includes the step 140 of determining a total cost for each of the plurality of mobile phones based on the combined costs calculated using the average cost per mobile phone and cost-per-minute. Referring back to "1:4 pool" example discussed above, if User 1 in this pool had 100 minutes of usage, then User 1's cost would be $20.25 (cost-per-minute: $0.08×100=$8; average cost: $12.25; total=$8+$12.25=$20.25). After performing this same operation for each user, the method 100 effectively allocates all monthly charges in different amounts at the line level.

As shown in FIG. 1, the method 100 may optionally include the step 150 of determining a final cost for each of the plurality of mobile phones based on the total cost for the corresponding mobile phone and any usage charges for the corresponding mobile phone. The usage charges may include costs for data, downloads, 411, and the like. For steps 120, 130, and 140, the usage charges are separated from all of the cost allocations until step 150, which is the determination of final cost for each of the plurality of mobile phones. For example, a user, Lucy, may have a $20 data plan on her mobile phone service. Using the method 100, the monthly costs for all of the mobile phones on Lucy's program are calculated and Lucy's final cost is calculated by adding her monthly cost with the cost of the data plan. By handling pooling and non-pooling features separately, the final cost determined using the method 100 ensures that users are only billed for their own non-pooling features. The method 100 also optionally includes the step 160 of producing a bill based on the final or total cost for each of the plurality of mobile phones.

An exemplary of a set of inputs for execution of the method 100 is shown in Attachment A. As shown in Attachment A, the set of inputs includes usage data, billing information, and other variables defined by three major wireless carriers (AT&T, Verizon, and Sprint in this example). Further, the exemplary set of inputs details example information provided from the carriers for a user identified by "A.USER," In this example, the carriers provide a variety of information in different formats.

A corresponding example of a resulting output from execution of the method 100 using such inputs is shown in Attachment B. As shown in Attachment B, the exemplary resulting output provides a single set of data for "A.USER" which is generated from the exemplary set of inputs.

Typically, each of the steps described above for method 100 automatically processes incoming account information, although one or more of the steps may not be automatic or automated. As described below, the method 100 may be implemented into a computer-readable medium and be carried out with the aid of a computer.

A computer-readable medium, such as a non-volatile storage medium, may comprise the steps of the method for optimizing data described above. For instance, the method may be incorporated into a computer program to automatically monitor and update the account information of debtors, automatically determine what account information is the best data, and automatically apply the best data to the particular account. The computer program may be generated in any software language or framework such as C#, COBOL, C++, Microsoft® .NET Framework, Ruby on Rails, or the like.

The computer-readable medium for performing the embodiments of the present disclosure may include computer-readable program code portions, such as a series of computer instructions, embodied in the computer-readable medium. It should be understood that the computer-readable program code portions may include separate executable portions for performing distinct functions to accomplish embodiments of the present disclosure. Additionally, or alternatively, one or more of the computer-readable program portions may include one or more executable portions for performing more than one function to thereby accomplish embodiments of the process of the present disclosure.

In conjunction with the computer-readable medium, a computer that includes a processor, such as a programmable-variety processor responsive to software instructions, a hard-wired state machine, or a combination of these may be used to carryout the method disclosed above. Such computers may also include memory, which in conjunction with the processor is used to process data and store information. Such memory can include one or more types of solid state memory, magnetic memory, or optical memory, just to name a few. By way of non-limiting example, the memory can include solid state electronic random access memory (RAM); sequential access memory (SAM), such as first-in, first-out (FIFO) variety or last-in, first-out (LIFO) variety; programmable read only memory (PROM); electronically programmable read only memory (EPROM); or electronically erasable programmable read only memory (EEPROM); an optical disc memory (such as a DVD or CD-ROM); a magnetically encoded hard disc, floppy disc, tape, or cartridge media; or a combination of these memory types. In addition, the memory may be volatile, non-volatile, or a hybrid combination of volatile and non-volatile varieties. The memory may include removable memory, such as, for example, memory in the form of a non-volatile electronic memory unit; an optical memory disk (such as a DVD or CD ROM); a magnetically encoded hard disk, floppy disk, tape, or cartridge media; or a combination of these or other removable memory types.

The computers described above may also include a display upon which information may be displayed in a manner perceptible to the user, such as, for example, a computer monitor, cathode ray tube, liquid crystal display, light emitting diode display, touchpad or touchscreen display, and/or other means known in the art for emitting a visually perceptible output. Such computers may also include one or more data entry means or devices, such as, for example, a keyboard, keypad, pointing device, mouse, touchpad, touchscreen, microphone, and/or other data entry means known in the art. Each computer also may comprise an audio display means such as one or more loudspeakers and/or other means known in the art for emitting an audibly perceptible output.

While this disclosure has been described as having various embodiments, these embodiments according to the present disclosure can be further modified within the scope and spirit of this disclosure. This application is therefore intended to cover any variations, uses, or adaptations of the disclosure using its general principles. For example, any methods disclosed herein represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains.

The invention claimed is:

1. A computerized method for rebilling a carrier bill, the method comprising:
    receiving one or more carrier bills for a plurality of mobile phones at a processor, the one or more carrier bills comprising a usage time for each mobile phone in the plurality of mobile phones and a total fee;
    determining, with the processor, a ratio for distributing the total fee amongst the plurality of mobile phones, the ratio being an average cost pricing model against a cost-per-minute pricing model;
    determining, with the processor, an average cost per mobile phone based on the ratio multiplied by the total fee and divided a total number of mobile phones in the plurality of mobile phones;
    determining, with the processor, a cost-per-time for each of the plurality of mobile phones based on one minus the ratio multiplied by the usage time of each of the plurality of mobile phones and divided by a total minutes, the total minutes being a sum of each usage time for each mobile phone; and
    determining, with the processor, a total cost for any of the plurality of mobile phones based on adding the average cost per mobile phone and the cost-per-time of the corresponding mobile phone of the plurality of mobile phones.

2. The method of claim 1, further comprising determining a final cost for any of the plurality of mobile phones based on the total cost for the corresponding mobile phone and any non-pooled usage charges for the corresponding mobile phone.

3. The method of claim 2, further comprising producing a bill based on the final cost for any of the plurality of mobile phones.

4. The method of claim 1, wherein the usage time comprise at least one of text costs and data plan costs.

5. The method of claim 1, further comprising receiving the one or more carrier bills through a file transfer.

6. The method of claim 1, further comprising obtaining the one or more carrier bills through an email.

7. The method of claim 1, further comprising calculating the usage time.

8. The method of claim 1, wherein the ratio is at least partially determined based upon historical usage amounts by any of the plurality of mobile phones.

9. A system for rebilling a carrier bill, the system comprising:
    a non-transitory computer-readable medium with a computer program for administering a method of rebilling a carrier bill, the non-transitory computer-readable medium comprising code portions stored therein, the computer-readable medium code portions comprising:
    a first executable portion for receiving one or more carrier bills for a plurality of mobile phones, the one or more carrier bills comprising a usage time for each mobile phone in the plurality of mobile phones and a total fee;
    a second executable portion for determining, with the processor, a ratio for distributing the total fee amongst the plurality of mobile phones, the ratio being an average cost pricing model against a cost-per-minute pricing model;
    a third executable portion for determining an average cost per mobile phone based on the ratio multiplied by the total fee and divided a total number of mobile phones in the plurality of mobile phones;

a fourth executable portion for determining a cost-per-time for each of the plurality of mobile phones based on one minus the ratio multiplied by the usage time of each of the plurality of mobile phones and divided by a total minutes, the total minutes being a sum of each usage time for each mobile phone; and a fifth executable portion for determining a total cost for any of the plurality of mobile phones based on adding the average cost per mobile phone and the cost-per-time of the corresponding mobile phone of the plurality of mobile phones; and a processor for executing the code portions.

10. The system of claim 9, further comprising a sixth executable portion for determining a final cost for any of the plurality of mobile phones based on the total cost for the corresponding mobile phone and any non-pooled usage charges for the corresponding mobile phone.

11. The system of claim 10, further comprising a seventh executable portion for producing a bill based on the final cost for any of the plurality of mobile phones.

12. The system of claim 9, wherein the usage time comprise at least one of text costs and data plan costs.

13. The system of claim 9, wherein the first executable portion is further configured to receive the one or more carrier bills through a file transfer.

14. The system of claim 9, wherein the first executable portion is further configured to obtain the one or more carrier bills through an email.

15. The system of claim 9, wherein the first executable portion is further configured to calculate the usage time.

16. The system of claim 9, wherein the ratio is at least partially determined based upon historical usage amounts by any of the plurality of mobile phones.

17. A non-transitory computer-readable medium with a computer program for administering a method of rebilling a carrier bill, the non-transitory computer-readable medium comprising code portions stored therein and a processor for executing the code portions, the computer-readable medium code portions comprising:

a first executable portion for determining a ratio for distributing a total fee of one or more carrier bills for a plurality of mobile phones amongst the plurality of mobile phones, the ratio being an average cost pricing model against a cost-per-minute pricing model;

a second executable portion for determining an average cost per mobile phone based on the ratio and usage time for the plurality of mobile phones and determining a cost-per-time for each of the plurality of mobile phones based on the ratio and the usage minutes for the plurality of mobile phones; and a third executable portion for determining a total cost for any of the plurality of mobile phones based on the average cost per mobile phone, cost-per-time of the corresponding mobile phone of the plurality of mobile phones, and a usage amount of the corresponding mobile phone of the plurality of mobile phones.

18. The computer readable medium of claim 17, further comprising a fourth executable portion for determining a final cost for any of the plurality of mobile phones based on the total cost for the corresponding mobile phone and any usage charges for the corresponding mobile phone.

19. The computer readable medium of claim 18, further comprising a fifth executable portion for producing a bill based on the final cost for any of the plurality of mobile phones.

20. The computer readable medium of claim 17, wherein the usage charges comprise at least one of text costs and data plan costs.

* * * * *